(12) United States Patent
Chao

(10) Patent No.: US 11,049,673 B2
(45) Date of Patent: Jun. 29, 2021

(54) KEY SWITCH

(71) Applicant: DARFON ELECTRONICS CORP., Taoyuan (TW)

(72) Inventor: Ling-Hsi Chao, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 16/871,064

(22) Filed: May 11, 2020

(65) Prior Publication Data

US 2020/0373106 A1 Nov. 26, 2020

(30) Foreign Application Priority Data

May 22, 2019 (TW) ................................. 108117600

(51) Int. Cl.
*H01H 13/70* (2006.01)
*H01H 13/7065* (2006.01)
*H01H 13/803* (2006.01)
*G06F 3/02* (2006.01)
*H01H 13/86* (2006.01)

(52) U.S. Cl.
CPC ....... *H01H 13/7065* (2013.01); *G06F 3/0202* (2013.01); *H01H 13/803* (2013.01); *H01H 13/86* (2013.01); *H01H 2221/04* (2013.01); *H01H 2239/024* (2013.01)

(58) Field of Classification Search
CPC .. H01H 13/7065; H01H 13/803; H01H 13/86; G06F 3/0202

USPC .......................................... 200/5 A, 341, 344
See application file for complete search history.

(56) References Cited

U.S. PATENT DOCUMENTS

| | | | |
|---|---|---|---|
| 2015/0101917 A1* | 4/2015 | Yen ........................ | G06F 3/0221 200/5 A |
| 2015/0332875 A1* | 11/2015 | Hsu ........................ | H01H 3/125 200/344 |
| 2019/0155401 A1* | 5/2019 | Chen ...................... | G06F 3/0221 |

FOREIGN PATENT DOCUMENTS

TW         201543272 A      11/2015

\* cited by examiner

*Primary Examiner* — Edwin A. Leon
*Assistant Examiner* — Iman Malakooti
(74) *Attorney, Agent, or Firm* — Winston Hsu

(57) ABSTRACT

A key switch includes a key cap, a base, a support device and a bracket. The base has a first magnetic area. The support device is disposed between the key cap and the base. The bracket is movably connected to the support device. The bracket has a second magnetic area corresponding to the first magnetic area. When the key cap is not pressed, a magnetic attraction force between the first and second magnetic areas keeps the key cap at a non-pressed position. When the key cap is pressed by an external force, the key cap moves with the support device from the non-pressed position to a pressed position. When the external force is released, the second magnetic area moves toward the first magnetic area due to the magnetic attraction force, such that the key cap moves with the support device from the pressed position to the non-pressed position.

5 Claims, 17 Drawing Sheets

KEY SWITCH

BACKGROUND OF THE INVENTION

1. Field of the Invention

The invention relates to a key switch and, more particularly, to a key switch utilizing a magnetic attraction force to drive a key cap to move with a support device between a non-pressed position and a pressed position.

2. Description of the Prior Art

A keyboard, which is the most common input device, can be found in variety of electronic equipment for users to input characters, symbols, numerals and so on. From consumer electronic products to industrial machine tools are all equipped with a key switch for purpose of operation.

Referring to FIG. 1, FIG. 1 is a cross-sectional view illustrating a key switch 1 of the prior art. As shown in FIG. 1, the key switch 1 comprises a base 10, a key cap 12, a circuit board 14, a support device 16 and a resilient member 18. The circuit board 14 is disposed on the base 10. The support device 16 is disposed between the key cap 12 and the base 10 and used for supporting the key cap 12. The resilient member 18 is also disposed between the key cap 12 and the base 10. After the key cap 12 is pressed by a user, the resilient member 18 provides an elastic force for the key cap 12, so as to make the key cap 12 returns to the original position. The resilient member 18 is usually made of rubber and rubber may get fatigue after being used for a long time, such that the lifetime of the key switch 1 may be reduced.

SUMMARY OF THE INVENTION

An objective of the invention is to provide a key switch utilizing a magnetic attraction force to drive a key cap to move with a support device between a non-pressed position and a pressed position, so as to solve the aforesaid problems.

According to an embodiment of the invention, the key switch comprises a key cap, a base, a support device and a bracket. The base has a first magnetic area. The support device is disposed between the key cap and the base. The key cap moves with the support device between a non-pressed position and a pressed position. The bracket is movably connected to the support device. The bracket has a second magnetic area corresponding to the first magnetic area. When the key cap is not pressed, a magnetic attraction force between the first magnetic area and the second magnetic area keeps the key cap at the non-pressed position. When the key cap is pressed by an external force and the second magnetic area moves away from the first magnetic area, the key cap moves with the support device from the non-pressed position to the pressed position. When the external force is released, the second magnetic area moves toward the first magnetic area due to the magnetic attraction force, such that the key cap moves with the support device from the pressed position to the non-pressed position.

According to another embodiment of the invention, a key switch comprises a key cap, a base, a support device, a magnetic induction member and a magnetic member. The base has a first magnetic area. The support device is disposed between the key cap and the base. The key cap moves with the support device between a non-pressed position and a pressed position. The magnetic induction member is fixed on the support device. The magnetic member is disposed on the magnetic induction member. The magnetic member induces the magnetic induction member to generate magnetism, so as to form a second magnetic area on the magnetic induction member, wherein the second magnetic area corresponds to the first magnetic area. When the key cap is not pressed, a magnetic attraction force between the first magnetic area and the second magnetic area keeps the key cap at the non-pressed position. When the key cap is pressed by an external force and the second magnetic area moves away from the first magnetic area, the key cap moves with the support device from the non-pressed position to the pressed position. When the external force is released, the second magnetic area moves toward the first magnetic area due to the magnetic attraction force, such that the key cap moves with the support device from the pressed position to the non-pressed position.

As mentioned in the above, in an embodiment of the invention, the bracket is movably connected to the support device and the second magnetic area is disposed on the bracket, wherein the second magnetic area corresponds to the first magnetic area of the base. Furthermore, in another embodiment of the invention, the magnetic induction member is fixed on the support device and the magnetic member is disposed on the magnetic induction member, such that the magnetic member induces the magnetic induction member to generate magnetism, so as to form the second magnetic area on the magnetic induction member, wherein the second magnetic area corresponds to the first magnetic area of the base. Accordingly, when the key cap is not pressed, the magnetic attraction force between the first magnetic area and the second magnetic area keeps the key cap at the non-pressed position. When the key cap is pressed by the external force and the second magnetic area moves away from the first magnetic area, the key cap moves with the support device from the non-pressed position to the pressed position. When the external force is released, the second magnetic area moves toward the first magnetic area due to the magnetic attraction force, such that the key cap moves with the support device from the pressed position to the non-pressed position. Since the resilient member of the conventional key switch is unnecessary for the invention, the lifetime of the key switch of the invention can be extended effectively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
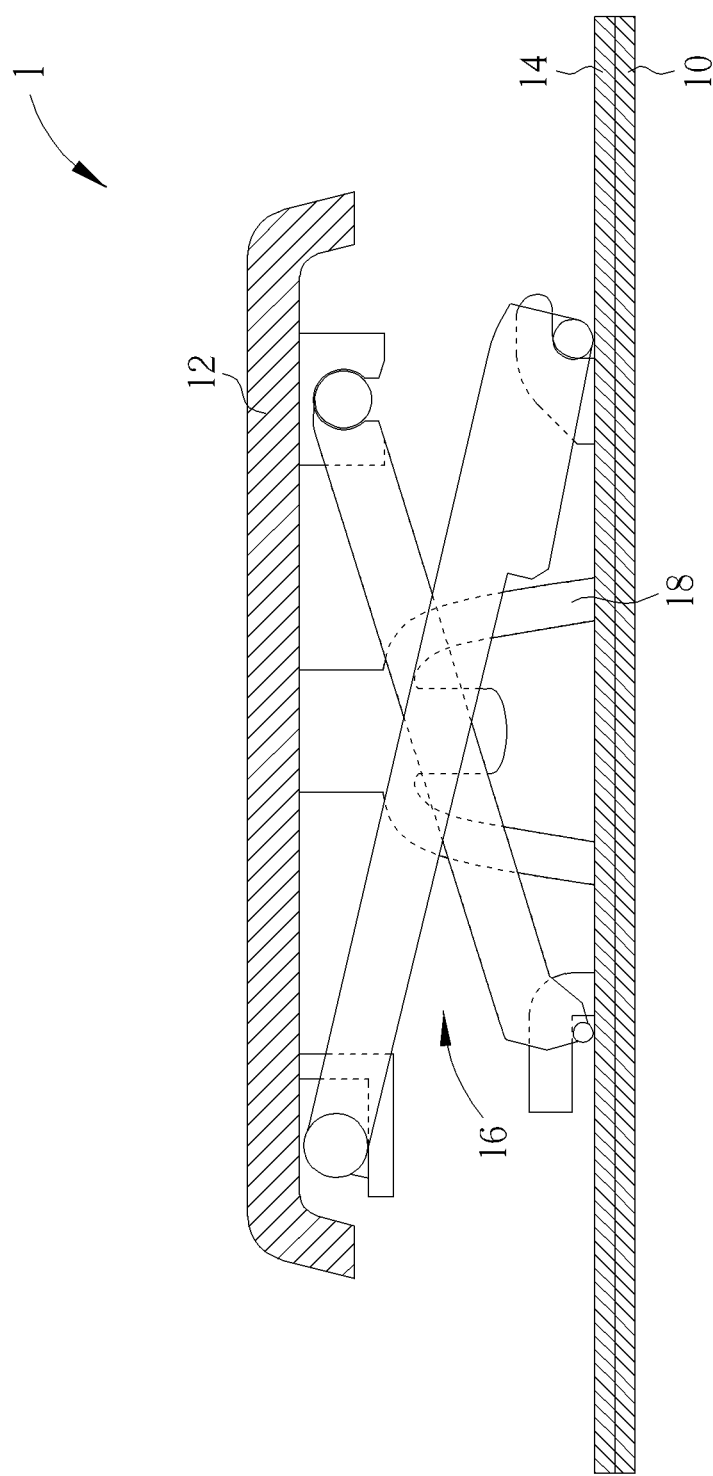
FIG. 1 is a cross-sectional view illustrating a key switch of the prior art.
Figure 2:
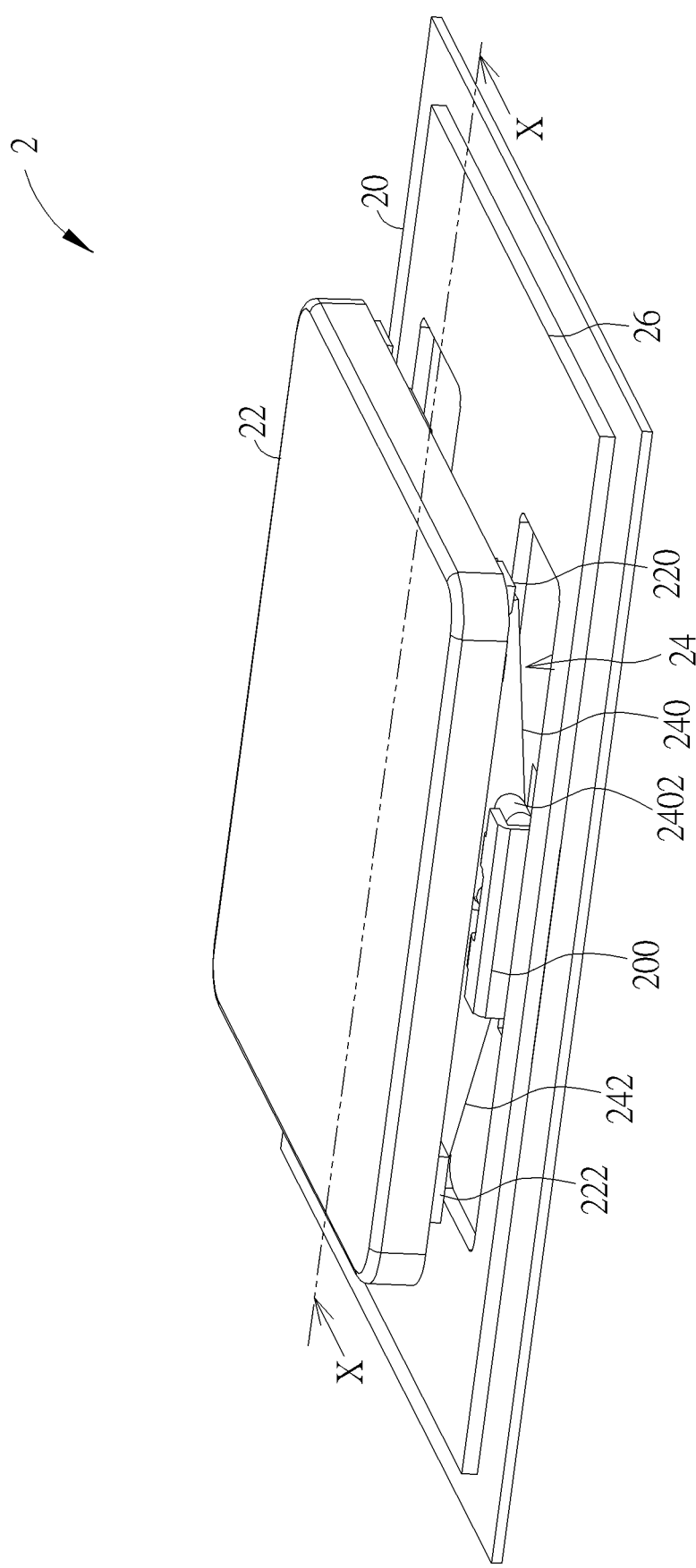
FIG. 2 is a perspective view illustrating a key switch according to an embodiment of the invention.
Figure 3:
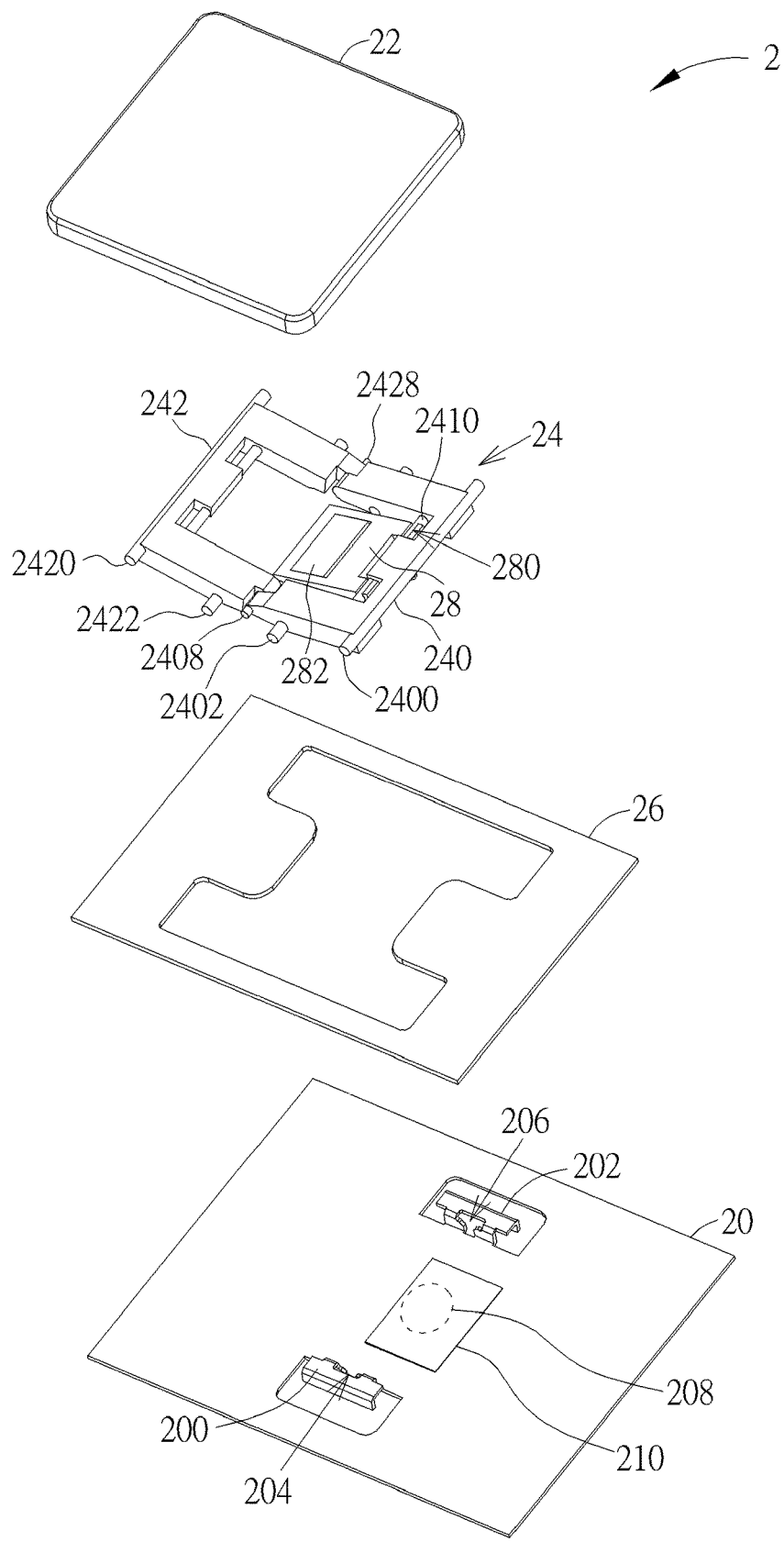
FIG. 3 is an exploded view illustrating the key switch shown in FIG. 2.
Figure 4:
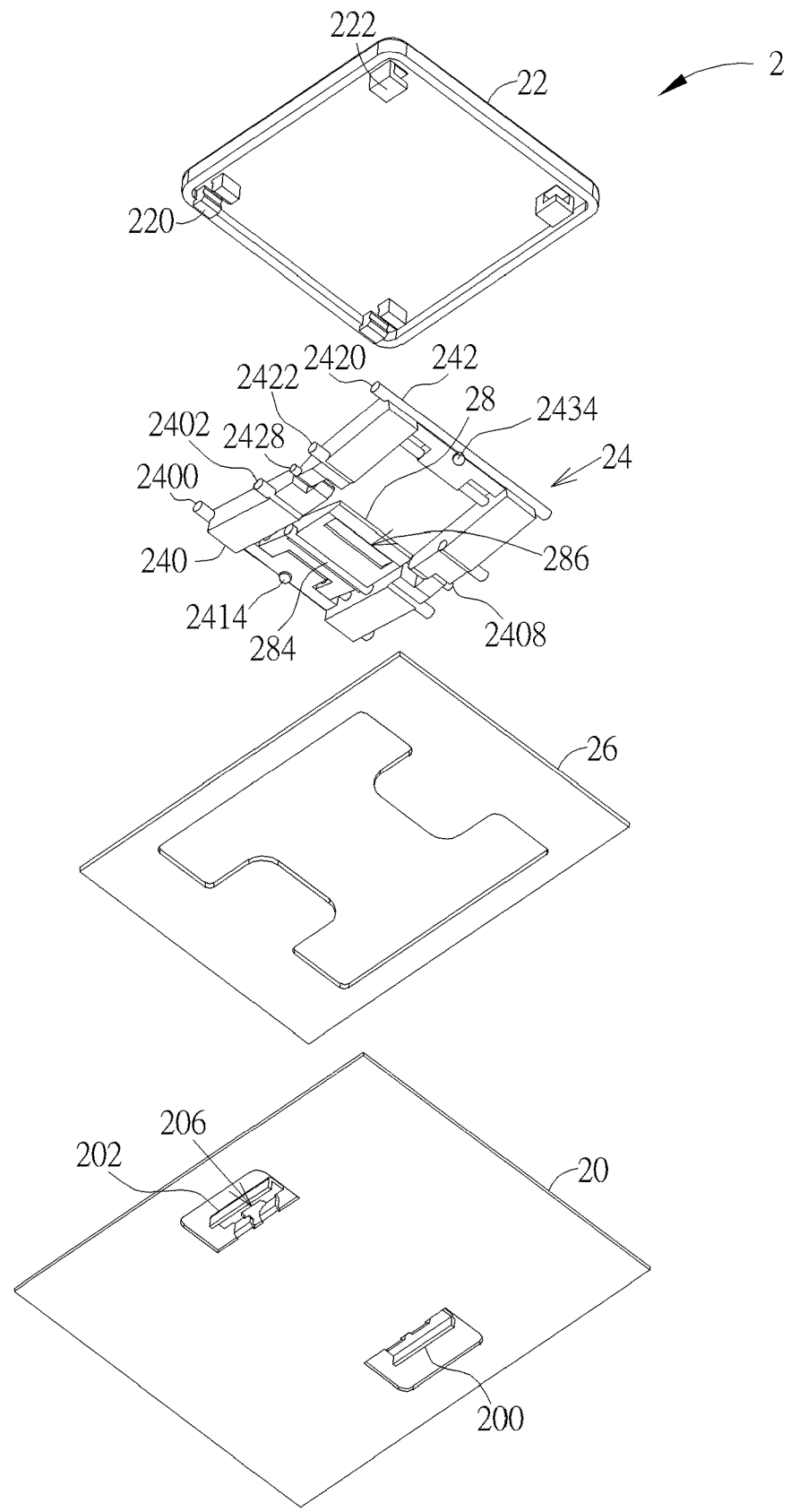
FIG. 4 is an exploded view illustrating the key switch shown in FIG. 2 from another viewing angle.
Figure 5:
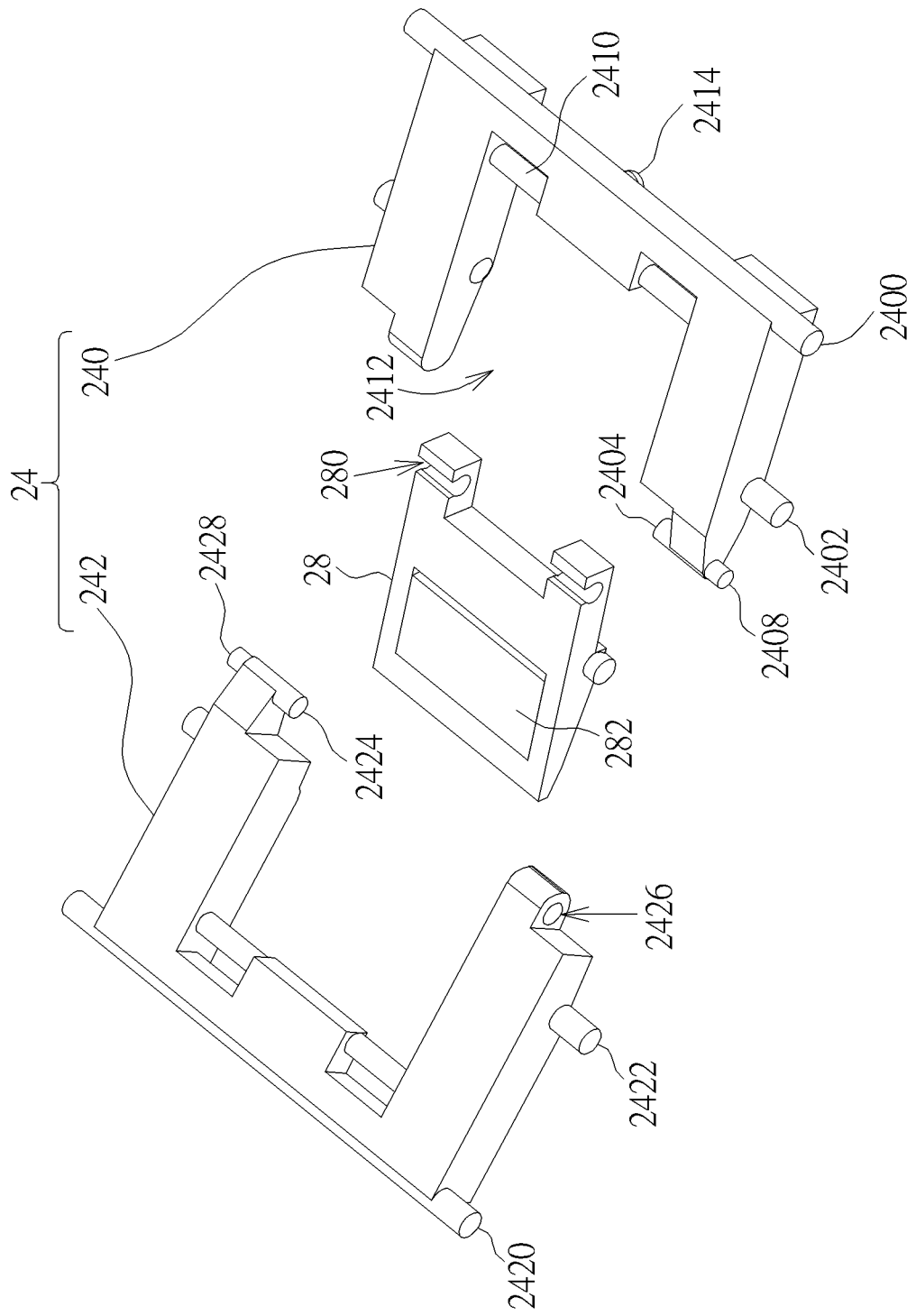
FIG. 5 is an exploded view illustrating the support device and the bracket shown in FIG. 3.
Figure 6:
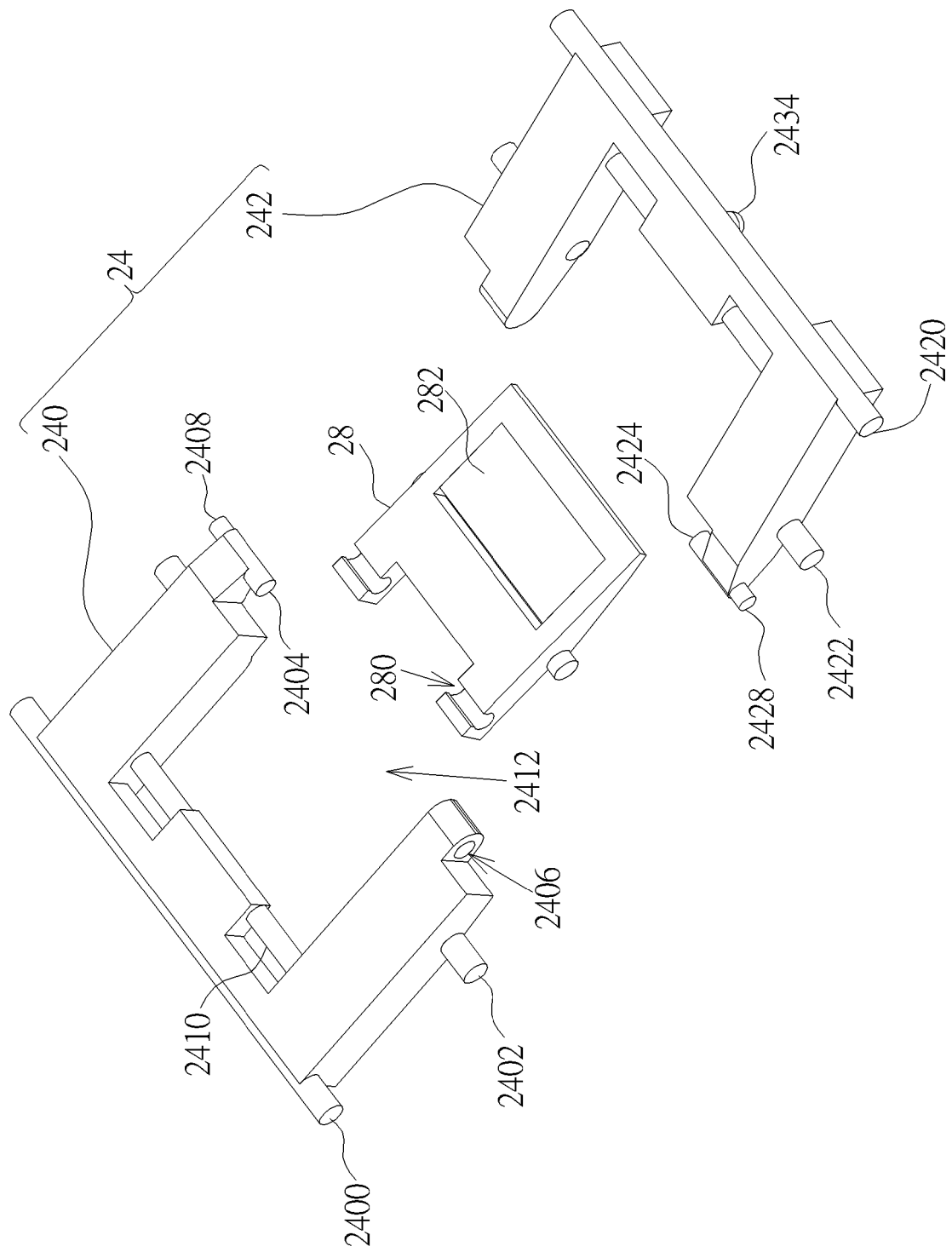
FIG. 6 is an exploded view illustrating the support device and the bracket shown in FIG. 3 from another viewing angle.
Figure 7:
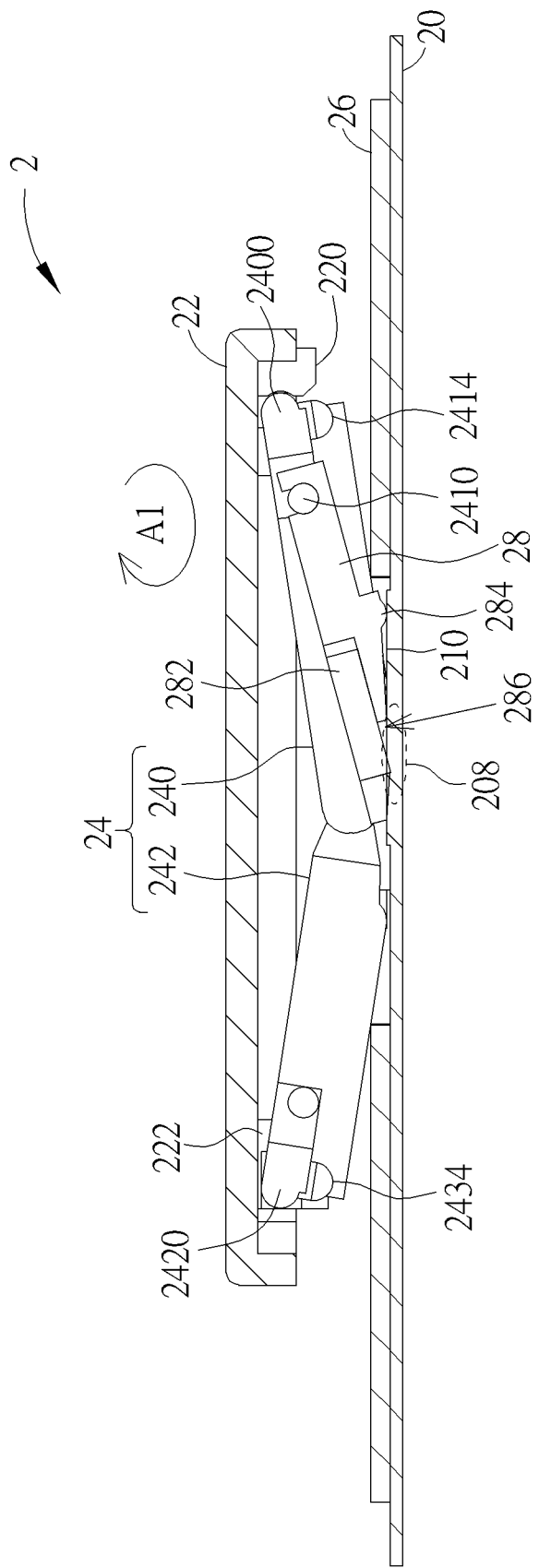
FIG. 7 is a sectional view illustrating the key switch along line X-X shown in FIG. 2.
Figure 8:
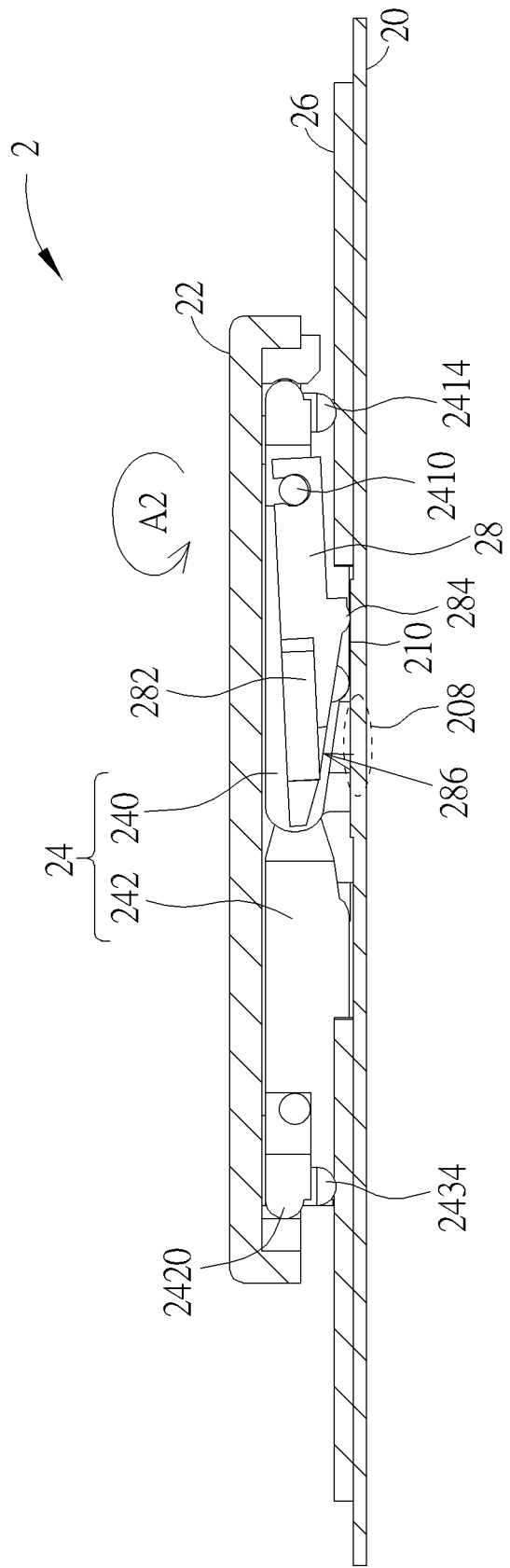
FIG. 8 is a sectional view illustrating the key cap shown in FIG. 7 being pressed.

Referring to FIGS. 2 to 8, FIG. 2 is a perspective view illustrating a key switch 2 according to an embodiment of the invention, FIG. 3 is an exploded view illustrating the key switch 2 shown in FIG. 2, FIG. 4 is an exploded view illustrating the key switch 2 shown in FIG. 2 from another viewing angle, FIG. 5 is an exploded view illustrating the support device 24 and the bracket 28 shown in FIG. 3, FIG. 6 is an exploded view illustrating the support device 24 and the bracket 28 shown in FIG. 3 from another viewing angle, FIG. 7 is a sectional view illustrating the key switch 2 along line X-X shown in FIG. 2, and FIG. 8 is a sectional view illustrating the key cap 22 shown in FIG. 7 being pressed. As shown in FIGS. 2 to 8, the key switch 2 comprises a base 20, a key cap 22, a support device 24, a circuit board 26 and a bracket 28. In practical applications, the circuit board 26 may be, but not limited to, a membrane circuit board.

The support device 24 is disposed between the key cap 22 and the base 20. In this embodiment, the support device 24 may comprise two support members 240, 242. Opposite sides of the support member 240 have two connecting portions 2400, 2402, wherein the connecting portion 2400 is rotatably connected to a connecting socket 220 of the key cap 22 and the connecting portion 2402 is rotatably connected to a connecting socket 200 of the base 20. Opposite sides of the support member 242 have two connecting portions 2420, 2422, wherein the connecting portion 2420 is rotatably connected to a connecting socket 222 of the key cap 22 and the connecting portion 2422 is rotatably connected to a connecting socket 202 of the base 20. It should be noted that the support device 24 may also be rotatably connected to the key cap 22 and the base 20 by other manners according to practical applications, so the invention is not limited to the aforesaid embodiment.

Furthermore, the support member 240 has a pivot portion 2404, a pivot hole 2406 and a restraining portion 2408, and the support member 242 has a pivot portion 2424, a pivot hole 2426 and a restraining portion 2428. The pivot portion 2404 of the support member 240 is inserted into the pivot hole 2426 of the support member 242 and the pivot portion 2424 of the support member 242 is inserted into the pivot hole 2406 of the support member 240, such that the support members 240, 242 are pivotally connected to each other. When the support device 24 is disposed between the key cap 22 and the base 20, the restraining portion 2408 of the support member 240 is located in a restraining recess 204 of the base 20 and the restraining portion 2428 of the support member 242 is located in a restraining recess 206 of the base 20, wherein the restraining recesses 204, 206 may be formed on the connecting sockets 200, 202. Accordingly, the key cap 22 can move with the support device 24 between a non-pressed position (as shown in FIG. 7) and a pressed position (as shown in FIG. 8).

The bracket 28 is movably connected to the support device 24. In this embodiment, the bracket 28 may have a hole 280 and the support member 240 of the support device 24 may have a shaft portion 2410 and an accommodating recess 2412. The bracket 28 may be pivotally connected to the shaft portion 2410 of the support member 240 by the hole 280 and accommodated in the accommodating recess 2412. Accordingly, the bracket 28 maybe rotatably connected to the support device 24. It should be noted that, in another embodiment, the bracket 28 may also be slidably connected to the support device 24 according to practical applications. Still further, the bracket 28 has a protruding portion 284. When the support device 24 with the bracket 28 is disposed between the keycap 22 and the base 20, the protruding portion 284 of the bracket 28 abuts against the base 20.

The base 20 has a first magnetic area 208 and the bracket 28 has a second magnetic area 282. When the support device 24 with the bracket 28 is disposed between the key cap 22 and the base 20, the second magnetic area 282 corresponds to the first magnetic area 208. One of the first magnetic area 208 and the second magnetic area 282 may be a magnetic member (e.g. magnet) and the other one of the first magnetic area 208 and the second magnetic area 282 may be a magnetic member (e.g. magnet) or a magnetic induction material (e.g. iron or other metals). In this embodiment, the first magnetic area 208 may be a magnetic induction material and the second magnetic area 282 may be a magnetic member. In practical applications, the base 20 may be made of a magnetic induction material wholly or only the first magnetic area 208 is made of a magnetic induction material. In another embodiment, the first magnetic area 208 and the second magnetic area 282 both may be magnets.

When the key cap 22 is not pressed, a magnetic attraction force between the first magnetic area 208 and the second magnetic area 282 keeps the key cap 22 at the non-pressed position (as shown in FIG. 7). When the key cap 22 is pressed by an external force, which can overcome the magnetic attraction force, the support device 24 drives the bracket 28 to move on the protruding portion 284 (i.e. the bracket 28 pivots on the protruding portion 284 toward a direction indicated by an arrow A1), such that the second magnetic area 282 moves away from the first magnetic area 208. When the key cap 22 is pressed by the external force and the second magnetic area 282 moves away from the first magnetic area 208, the key cap 22 moves with the support device 24 from the non-pressed position to the pressed position (as shown in FIG. 8). When the external force is released, the first magnetic area 208 attracts the second magnetic area 282 magnetically and then the second magnetic area 282 drives the bracket 28 to move on the protruding portion 284 (i.e. the bracket 28 pivots on the protruding portion 284 toward a direction indicated by an arrow A2), such that the second magnetic area 282 moves toward the first magnetic area 208. When the second magnetic area 282 moves toward the first magnetic area 208 due to the magnetic attraction force, the key cap 22 moves with the support device 24 from the pressed position to the non-pressed position.

In this embodiment, the support member 240 may have a trigger portion 2414 and the support member 242 may have a trigger portion 2434. Accordingly, as shown in FIG. 8, when the key cap 22 is pressed to the pressed position, the trigger portion 2414 of the support member 240 and the trigger portion 2434 of the support member 242 will trigger switches of the circuit board 26, so as to execute input function correspondingly.

In this embodiment, the bracket 28 may have an opening 286, wherein the opening 286 corresponds to the first magnetic area 208 and and the second magnetic area 282 is exposed from the opening 286. Accordingly, the first magnetic area 208 and the second magnetic area 282 may attract each other directly, so as to enhance the magnetic attraction force between the first magnetic area 208 and the second magnetic area 282.

In this embodiment, the base 20 may have a protruding platform 210 and the protruding portion 284 of the bracket 28 abuts against the protruding platform 210. If the protruding platform 210 is higher, the bracket 28 drives the support device 24 to lift the key cap 22, such that the key cap 22 is farther away from the base 20. On the other hand, if the protruding platform is lower, the bracket 28 drives the support device 24 to lower the key cap 22, such that the key cap 22 is closer to the base 20. Thus, the invention may adjust the total height of the key switch 2 and the press distance of the key cap 22 by changing the height of the protruding platform 210.

Figure 9:
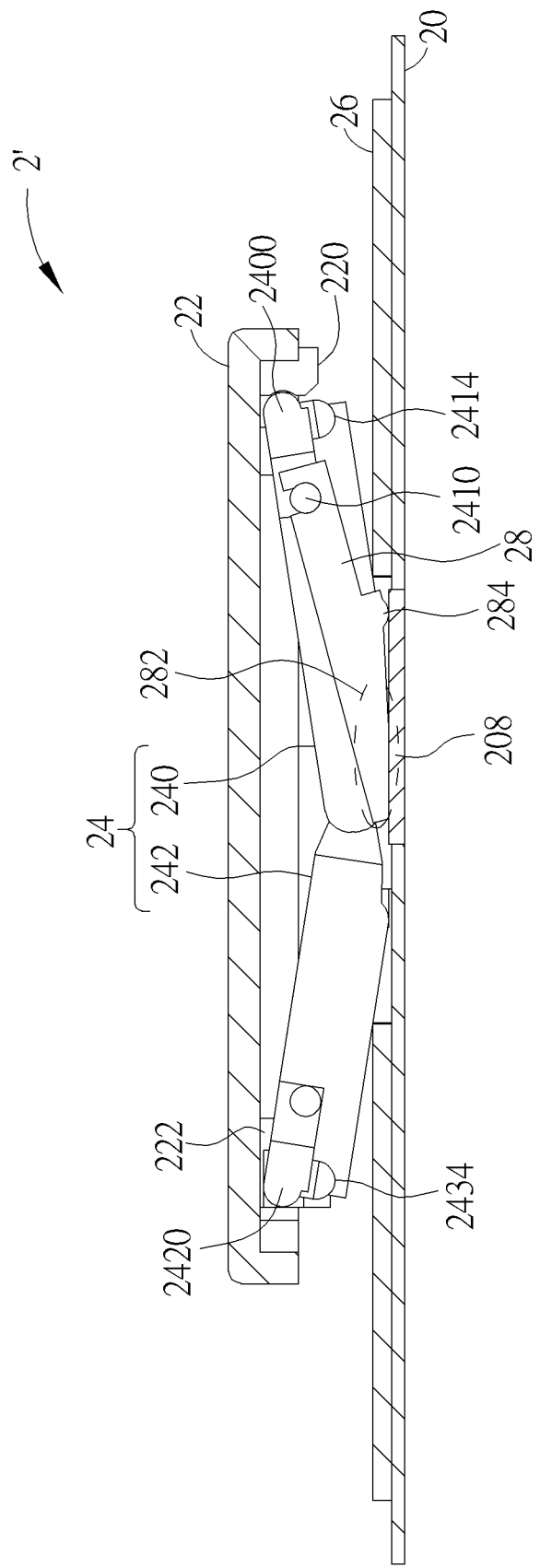
FIG. 9 is a sectional view illustrating a key switch according to another embodiment of the invention.

Referring to FIG. 9, FIG. 9 is a sectional view illustrating a key switch 2' according to another embodiment of the invention. The main difference between the key switch 2' and the aforesaid key switch 2 is that the first magnetic area 208 of the key switch 2' is a magnetic member and the second magnetic area 282 of the key switch 2' is a magnetic induction material. In practical applications, the bracket 28 may be made of a magnetic induction material wholly or only the second magnetic area 282 is made of a magnetic induction material. It should be noted that the same elements in FIG. 9 and FIGS. 2-8 are represented by the same numerals, so the repeated explanation will not be depicted herein again.

Figure 10:
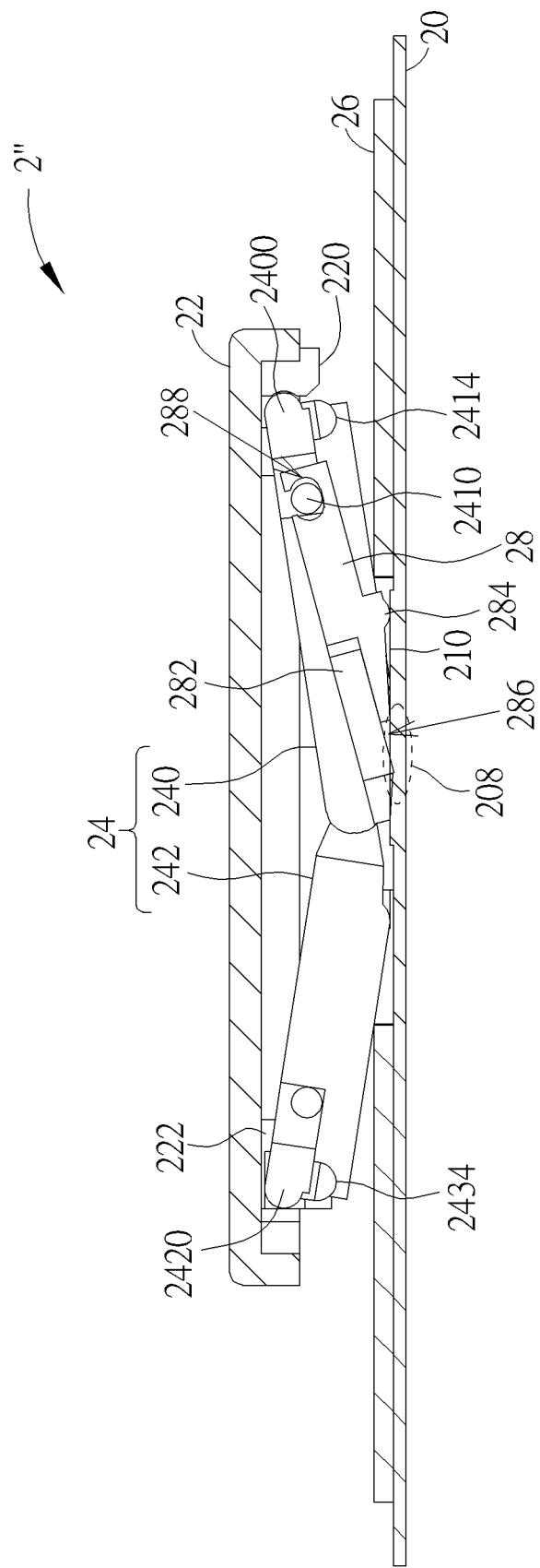
FIG. 10 is a sectional view illustrating a key switch according to another embodiment of the invention.

Referring to FIG. 10, FIG. 10 is a sectional view illustrating a key switch 2'' according to another embodiment of the invention. The main difference between the key switch 2' and the aforesaid key switch 2 is that the hole 280 of the bracket 28 of the key switch 2 is replaced by a slot 288 of the bracket 28 of the key switch 2''. As shown in FIG. 10, the shaft portion 2410 of the support member 240 is disposed in the slot 288 of the bracket 28. When the key cap 22 is pressed, the shaft portion 2410 may slide in the slot 288. Accordingly, in this embodiment, the bracket 28 is slidably connected to the support device 24. It should be noted that the same elements in FIG. 10 and FIGS. 2-8 are represented by the same numerals, so the repeated explanation will not be depicted herein again.

Figure 11:
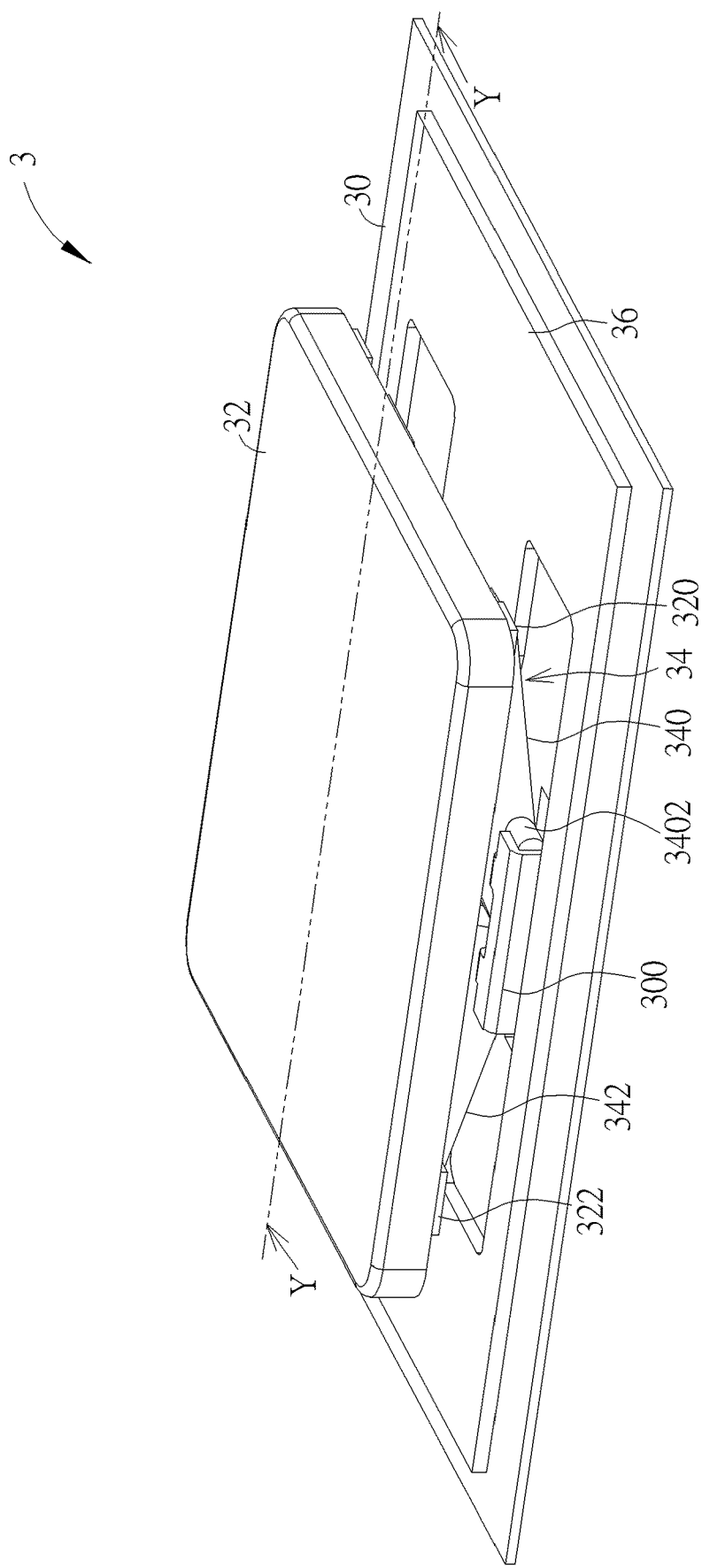
FIG. 11 is a perspective view illustrating a key switch according to another embodiment of the invention.
Figure 12:
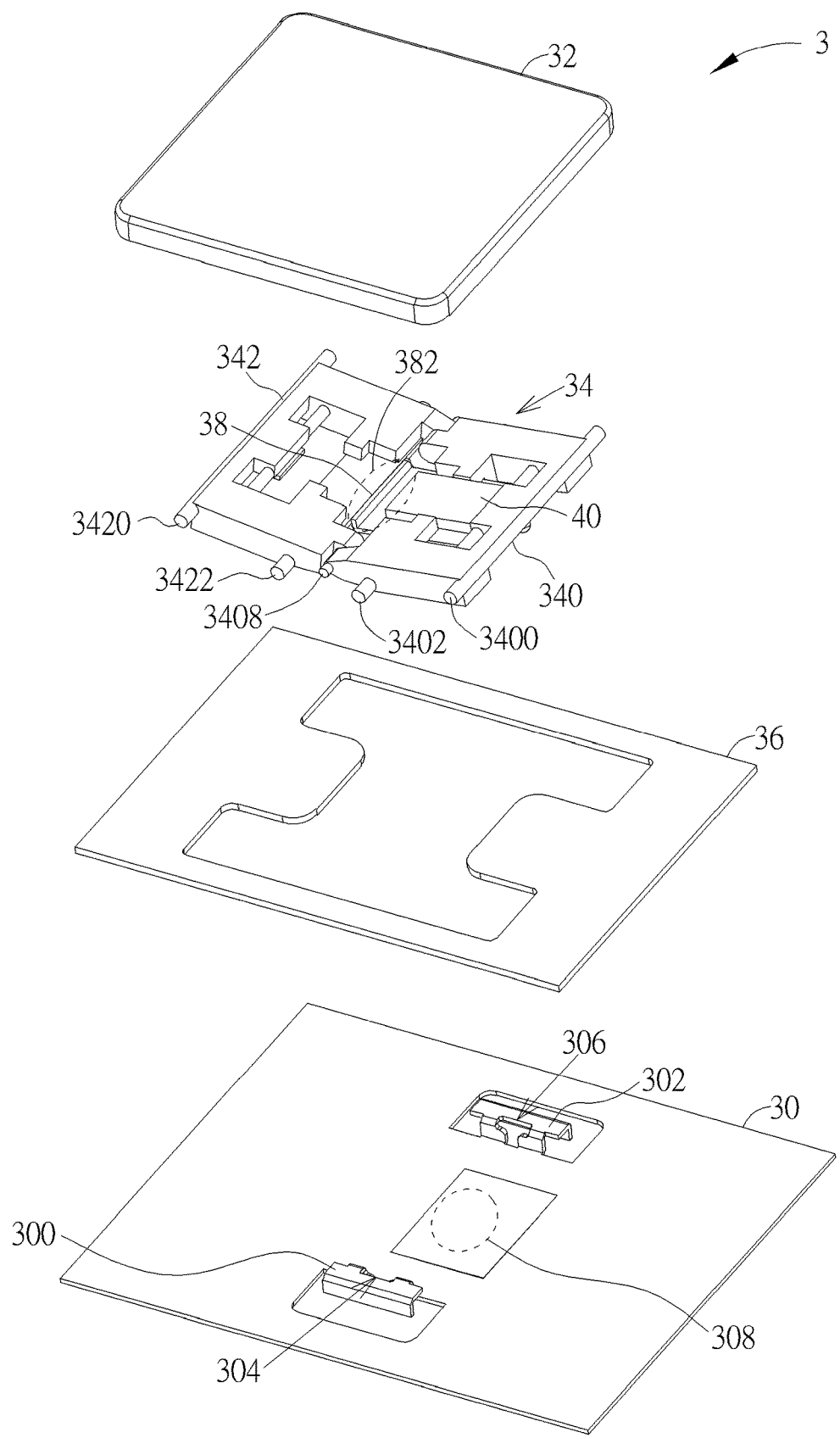
FIG. 12 is an exploded view illustrating the key switch shown in FIG. 11.
Figure 13:
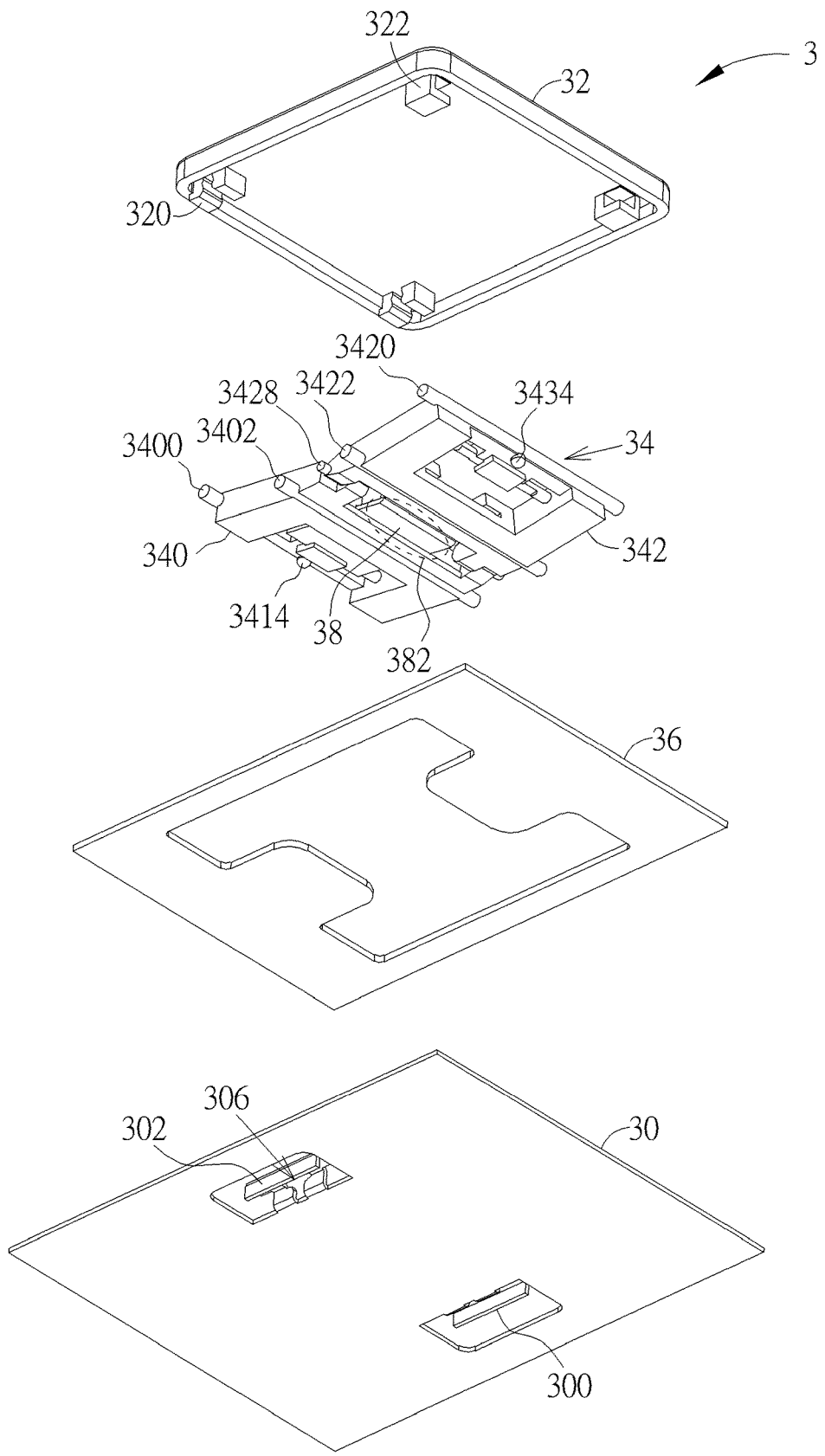
FIG. 13 is an exploded view illustrating the key switch shown in FIG. 11 from another viewing angle.
Figure 14:
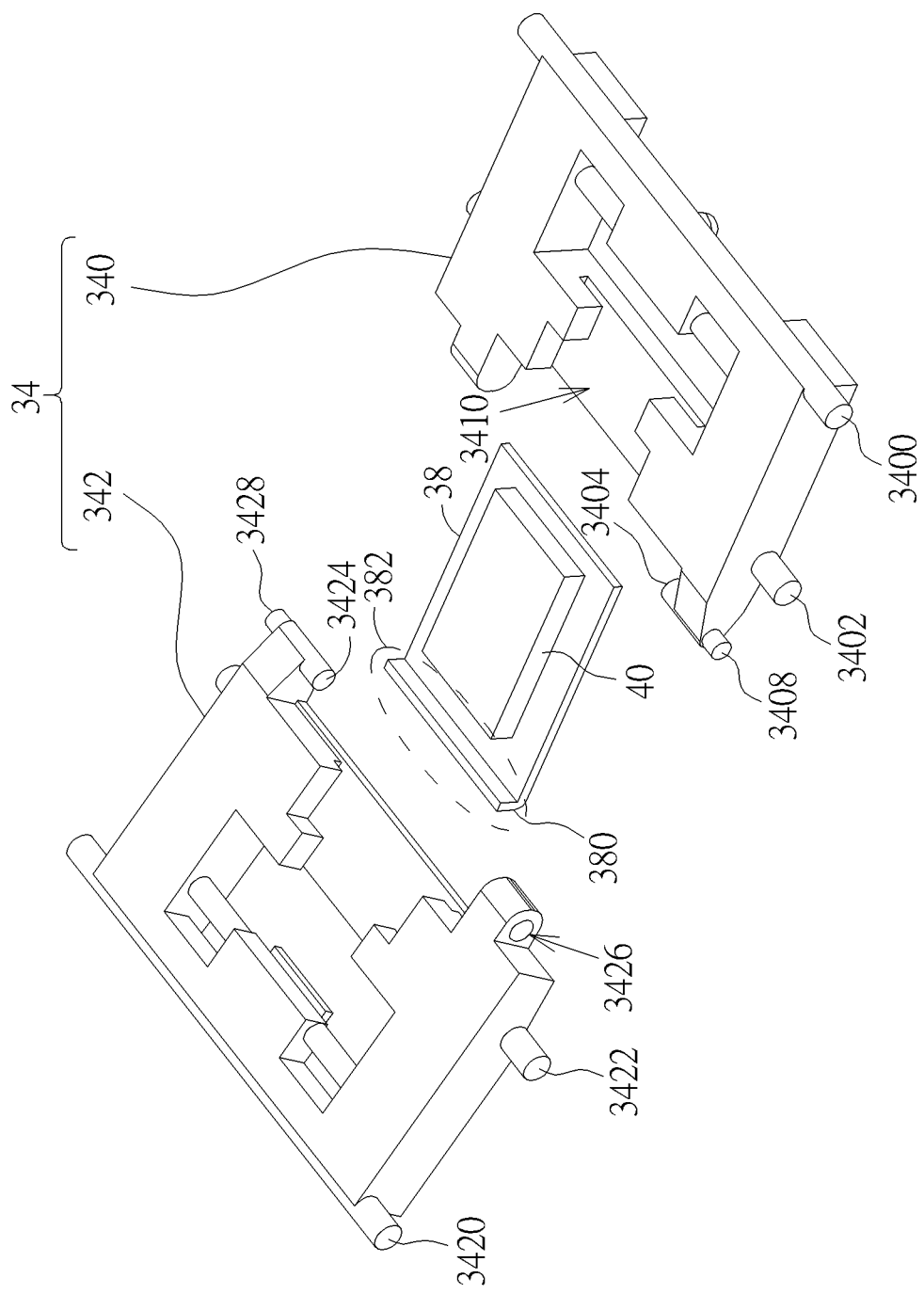
FIG. 14 is an exploded view illustrating the support device and the magnetic induction member shown in FIG. 12.
Figure 15:
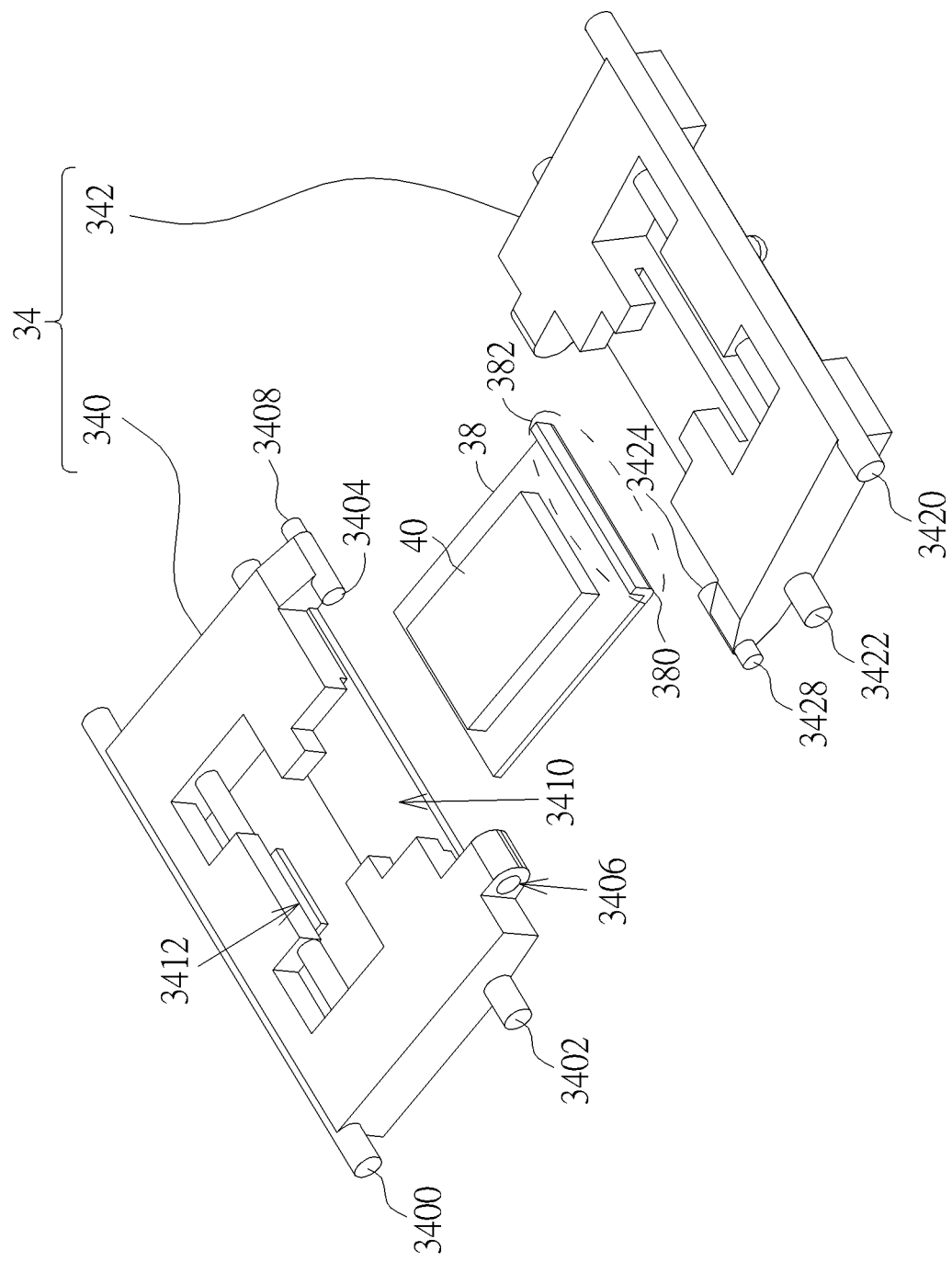
FIG. 15 is an exploded view illustrating the support device and the magnetic induction member shown in FIG. 12 from another viewing angle.
Figure 16:
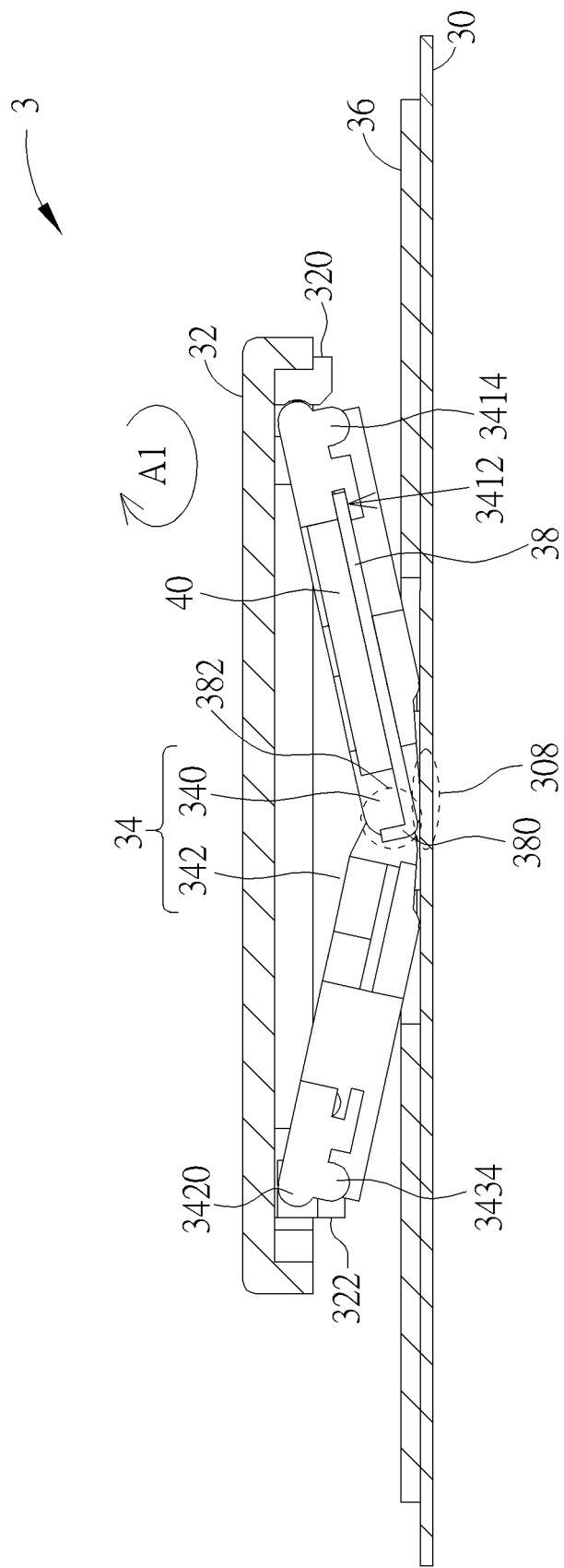
FIG. 16 is a sectional view illustrating the key switch along line Y-Y shown in FIG. 11.
Figure 17:
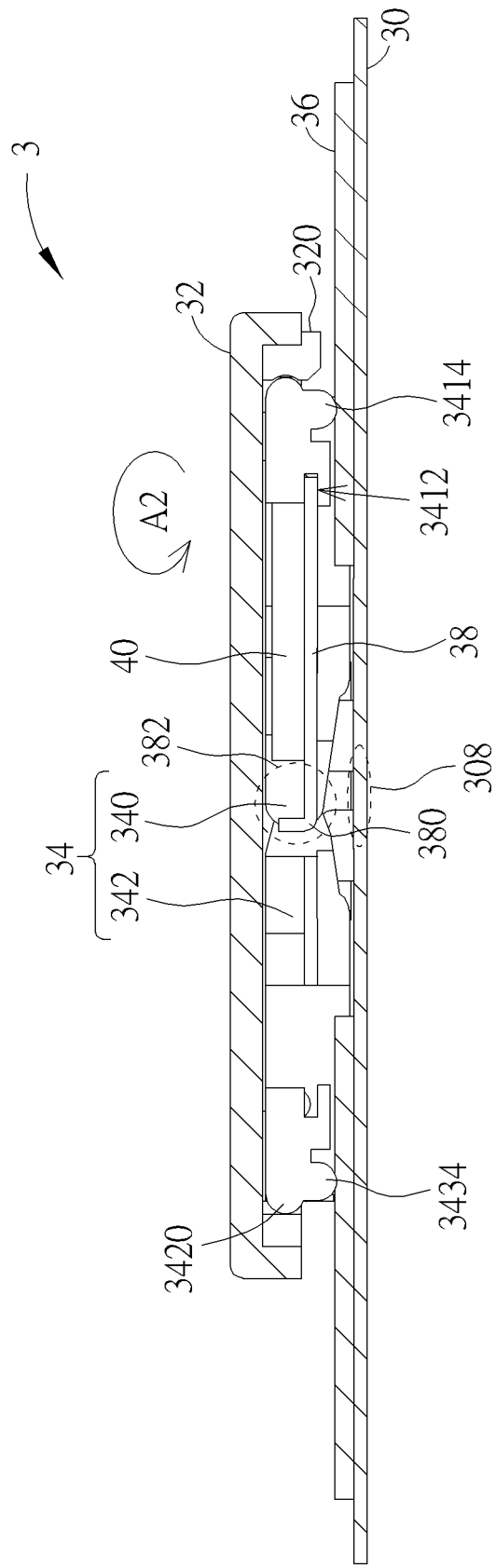
FIG. 17 is a sectional view illustrating the key cap shown in FIG. 16 being pressed.

Referring to FIGS. 11 to 17, FIG. 11 is a perspective view illustrating a key switch 3 according to another embodiment of the invention, FIG. 12 is an exploded view illustrating the key switch 3 shown in FIG. 11, FIG. 13 is an exploded view illustrating the key switch 3 shown in FIG. 11 from another viewing angle, FIG. 14 is an exploded view illustrating the support device 34 and the magnetic induction member 38 shown in FIG. 12, FIG. 15 is an exploded view illustrating the support device 34 and the magnetic induction member 38 shown in FIG. 12 from another viewing angle, FIG. 16 is a sectional view illustrating the key switch 3 along line Y-Y shown in FIG. 11, and FIG. 17 is a sectional view illustrating the key cap 32 shown in FIG. 16 being pressed. As shown in FIGS. 11 to 17, the key switch 3 comprises a base 30, a key cap 32, a support device 34, a circuit board 36, a magnetic induction member 38 and a magnetic member 40. In practical applications, the circuit board 36 may be, but not limited to, a membrane circuit board.

The support device 34 is disposed between the key cap 32 and the base 30. In this embodiment, the support device 34 may comprise two support members 340, 342. Opposite sides of the support member 340 have two connecting portions 3400, 3402, wherein the connecting portion 3400 is rotatably connected to a connecting socket 320 of the key cap 32 and the connecting portion 3402 is rotatably connected to a connecting socket 300 of the base 30. Opposite sides of the support member 342 have two connecting portions 3420, 3422, wherein the connecting portion 3420 is rotatably connected to a connecting socket 322 of the key cap 32 and the connecting portion 3422 is rotatably connected to a connecting socket 302 of the base 30. It should be noted that the support device 34 may also be rotatably connected to the key cap 32 and the base 30 by other manners according to practical applications, so the invention is not limited to the aforesaid embodiment.

Furthermore, the support member 340 has a pivot portion 3404, a pivot hole 3406 and a restraining portion 3408, and the support member 342 has a pivot portion 3424, a pivot hole 3426 and a restraining portion 3428. The pivot portion 3404 of the support member 340 is inserted into the pivot hole 3426 of the support member 342 and the pivot portion 3424 of the support member 342 is inserted into the pivot hole 3406 of the support member 340, such that the support members 340, 342 are pivotally connected to each other. When the support device 34 is disposed between the key cap 32 and the base 30, the restraining portion 3408 of the support member 340 is located in a restraining recess 304 of the base 30 and the restraining portion 3428 of the support member 342 is located in a restraining recess 306 of the base 30, wherein the restraining recesses 304, 306 may be formed on the connecting sockets 300, 302. Accordingly, the key cap 32 can move with the support device 34 between a non-pressed position (as shown in FIG. 16) and a pressed position (as shown in FIG. 17).

The magnetic induction member 38 is fixed on the support device 34 and the magnetic member 40 is disposed on the magnetic induction member 38. In this embodiment, the support member 340 of the support device 34 may have a sliding recess 3410 and an engaging recess 3412. The magnetic induction member 38 may be inserted into the sliding recess 3410 to engage with the engaging recess 3412, so as to be fixed on the support member 340 of the support device 34. When the magnetic member 40 is disposed on the magnetic induction member 38, the magnetic member 40 induces the magnetic induction member 38 to generate magnetism, so as to form a second magnetic area 382 on the magnetic induction member 38.

The base 30 has a first magnetic area 308. When the support device 34 with the magnetic induction member 38 and the magnetic member 40 is disposed between the key cap 32 and the base 30, the second magnetic area 382 corresponds to the first magnetic area 308. The first magnetic area 308 may be a magnetic member (e.g. magnet) or a magnetic induction material (e.g. iron or other metals). The magnetic induction member 38 may be made of a magnetic induction material (e.g. iron or other metals) and the magnetic member 40 may be a magnet.

When the key cap 32 is not pressed, a magnetic attraction force between the first magnetic area 308 and the second magnetic area 382 keeps the key cap 32 at the non-pressed position (as shown in FIG. 16). At this time, an end portion 380 of the magnetic induction member 38 abuts against the base 30, wherein the second magnetic area 382 is located at the end portion 380 of the magnetic induction member 38. When the key cap 32 is pressed by an external force, which can overcome the magnetic attraction force, the support device 34 drives the magnetic induction member 38 to rotate toward a direction indicated by an arrow A1, such that the second magnetic area 382 moves away from the first magnetic area 308. When the key cap 32 is pressed by the external force and the second magnetic area 382 moves away from the first magnetic area 308, the key cap 32 moves with the support device 34 from the non-pressed position to the pressed position (as shown in FIG. 17). At this time, the end portion 380 of the magnetic induction member 38 is away from the base 30. When the external force is released, the first magnetic area 308 attracts the second magnetic area 382 magnetically and then the magnetic induction member 38 rotates toward a direction indicated by an arrow A2, such that the second magnetic area 382 moves toward the first magnetic area 308. When the second magnetic area 382 moves toward the first magnetic area 308 due to the magnetic attraction force, the key cap 32 moves with the support device 34 from the pressed position to the non-pressed position. Since the magnetic member 40 is disposed on the magnetic induction member 38, the magnetic member 40 will not hit the base 30 as the key cap 32 is pressed. Accordingly, the invention can prevent the magnetic member 40 from being hit and damaged.

In this embodiment, the support member 340 may have a trigger portion 3414 and the support member 342 may have a trigger portion 3434. Accordingly, as shown in FIG. 17, when the key cap 32 is pressed to the pressed position, the trigger portion 3414 of the support member 340 and the trigger portion 3434 of the support member 342 will trigger switches of the circuit board 36, so as to execute input function correspondingly.

As mentioned in the above, in an embodiment of the invention, the bracket is movably connected to the support device and the second magnetic area is disposed on the bracket, wherein the second magnetic area corresponds to the first magnetic area of the base. Furthermore, in another embodiment of the invention, the magnetic induction member is fixed on the support device and the magnetic member is disposed on the magnetic induction member, such that the magnetic member induces the magnetic induction member to generate magnetism, so as to form the second magnetic area on the magnetic induction member, wherein the second magnetic area corresponds to the first magnetic area of the base. Accordingly, when the key cap is not pressed, the magnetic attraction force between the first magnetic area and the second magnetic area keeps the key cap at the non-pressed position. When the key cap is pressed by the external force and the second magnetic area moves away from the first magnetic area, the key cap moves with the support device from the non-pressed position to the pressed position. When the external force is released, the second magnetic area moves toward the first magnetic area due to the magnetic attraction force, such that the key cap moves with the support device from the pressed position to the non-pressed position. Since the resilient member of the conventional key switch is unnecessary for the invention, the lifetime of the key switch of the invention can be extended effectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A key switch comprising:
   a key cap;
   a base having a first magnetic area and a protruding platform;
   a support device disposed between the key cap and the base, the key cap moving with the support device between a non-pressed position and a pressed position; and
   a bracket movably connected to the support device, the bracket having a second magnetic area and a protruding portion, the second magnetic area corresponding to the first magnetic area, the protruding portion abutting against the protruding platform;
   wherein when the key cap is not pressed, a magnetic attraction force between the first magnetic area and the second magnetic area keeps the key cap at the non-pressed position; when the key cap is pressed by an external force, the support device drives the bracket to move on the protruding portion, such that the second magnetic area moves away from the first magnetic area and the key cap moves with the support device from the non-pressed position to the pressed position; when the external force is released, the first magnetic area attracts the second magnetic area magnetically and then the second magnetic area drives the bracket to move on the protruding portion, such that the second magnetic area moves toward the first magnetic area and the key cap moves with the support device from the pressed position to the non-pressed position.

2. The key switch of claim 1, wherein the bracket has an opening, the opening corresponds to the first magnetic area, and the second magnetic area is exposed from the opening.

3. The key switch of claim 1, wherein one of the first magnetic area and the second magnetic area is a magnetic member and the other one of the first magnetic area and the second magnetic area is a magnetic member or a magnetic induction material.

4. A key switch comprising:
   a key cap;
   a base having a first magnetic area;
   a support device disposed between the key cap and the base, the key cap moving with the support device between a non-pressed position and a pressed position;
   a magnetic induction member fixed on the support device; and
   a magnetic member disposed on the magnetic induction member, the magnetic member inducing the magnetic induction member to generate magnetism, so as to form a second magnetic area on the magnetic induction member, the second magnetic area corresponding to the first magnetic area;
   wherein when the key cap is not pressed, a magnetic attraction force between the first magnetic area and the second magnetic area keeps the key cap at the non-pressed position; when the key cap is pressed by an external force and the second magnetic area moves away from the first magnetic area, the key cap moves with the support device from the non-pressed position to the pressed position; when the external force is released, the second magnetic area moves toward the first magnetic area due to the magnetic attraction force, such that the key cap moves with the support device from the pressed position to the non-pressed position.

5. The key switch of claim 4, wherein when the key cap is kept at the non-pressed position, an end portion of the magnetic induction member abuts against the base; when the key cap moves with the support device from the non-pressed position to the pressed position, the end portion of the magnetic induction member moves away from the base; the second magnetic area is located at the end portion of the magnetic induction member.

* * * * *